(12) United States Patent
Kawaguchi et al.

(10) Patent No.: US 11,692,937 B2
(45) Date of Patent: Jul. 4, 2023

(54) SPECTRAL CALIBRATION APPARATUS AND SPECTRAL CALIBRATION METHOD

(71) Applicant: HITACHI HIGH-TECH CORPORATION, Tokyo (JP)

(72) Inventors: Yohei Kawaguchi, Tokyo (JP); George Chalkidis, Tokyo (JP); Tomohiro Yasuda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 104 days.

(21) Appl. No.: 17/269,098

(22) PCT Filed: Aug. 9, 2019

(86) PCT No.: PCT/JP2019/031581
§ 371 (c)(1),
(2) Date: Feb. 17, 2021

(87) PCT Pub. No.: WO2020/054292
PCT Pub. Date: Mar. 19, 2020

(65) Prior Publication Data
US 2021/0310951 A1 Oct. 7, 2021

(30) Foreign Application Priority Data
Sep. 10, 2018 (JP) .................................. 2018-168596

(51) Int. Cl.
*G01N 21/64* (2006.01)

(52) U.S. Cl.
CPC ..... *G01N 21/6408* (2013.01); *G01N 21/6428* (2013.01); *G01N 2021/6439* (2013.01); *G01N 2201/127* (2013.01)

(58) Field of Classification Search
CPC ........... G01N 21/6408; G01N 21/6428; G01N 2021/6439; G01N 2201/127; G01N 2021/6441; G01N 21/274; G01N 21/64
See application file for complete search history.

(56) References Cited

U.S. PATENT DOCUMENTS 5,871,628 A * 2/1999 Dabiri .............. G01N 27/44721
204/461
6,333,501 B1 * 12/2001 Labrenz ............... G01N 21/274
250/341.5

(Continued)

FOREIGN PATENT DOCUMENTS

| JP | 2020-041876 A | 3/2020 |
| WO | 2001/055699 A1 | 8/2001 |
| WO | 2017/130349 A1 | 8/2017 |

OTHER PUBLICATIONS

International Search Report, PCT/JP2019/031581, dated Sep. 24, 2019 (1 pg.).

(Continued)

*Primary Examiner* — David P Porta
*Assistant Examiner* — Djura Malevic
(74) *Attorney, Agent, or Firm* — Volpe Koenig

(57) ABSTRACT

Provided are a spectral calibration apparatus and a spectral calibration method capable of performing spectral calibration with high accuracy even when peaks appear simultaneously between fluorescent dyes.

The spectral calibration apparatus for calculating a color conversion matrix used in color conversion processing, includes a spectral signal acquisition unit that acquires a spectral signal of fluorescence detected over time, a candidate calculation unit that calculates a candidate of the color conversion matrix for each value of a parameter, which depends on a frequency at which fluorescence peaks of fluorescent dyes appear at the same time, based on the (Continued)

spectral signal, and a selection unit that selects a color conversion matrix based on an evaluation value calculated for each candidate.

8 Claims, 11 Drawing Sheets

(56) References Cited

U.S. PATENT DOCUMENTS

| | | | | |
|---|---|---|---|---|
| 6,616,824 | B1 * | 9/2003 | Tanaka | G01N 27/44721 |
| | | | | 204/603 |
| 6,618,140 | B2 * | 9/2003 | Frost | G01J 3/10 |
| | | | | 250/459.1 |
| 6,734,420 | B2 * | 5/2004 | Empedocles | G01N 21/6452 |
| | | | | 250/271 |
| 6,738,502 | B1 * | 5/2004 | Coleman | G01N 21/274 |
| | | | | 382/167 |
| 6,863,791 | B1 * | 3/2005 | Liu | G06V 20/69 |
| | | | | 204/461 |
| 7,280,203 | B2 * | 10/2007 | Olschewski | G02B 21/0076 |
| | | | | 250/459.1 |
| 7,289,217 | B2 * | 10/2007 | Boege | G01N 21/253 |
| | | | | 356/417 |
| 7,383,261 | B2 * | 6/2008 | Mestha | G01J 3/50 |
| 7,384,525 | B2 * | 6/2008 | Liu | G06V 20/69 |
| | | | | 204/616 |
| 7,394,482 | B2 * | 7/2008 | Olschewski | G01J 3/4406 |
| | | | | 348/79 |
| 7,417,726 | B2 * | 8/2008 | Kao | H04N 5/361 |
| | | | | 356/243.1 |
| 7,471,385 | B2 * | 12/2008 | Mestha | G01N 21/25 |
| | | | | 356/402 |
| 7,519,514 | B2 * | 4/2009 | Roushall | H01J 49/0036 |
| | | | | 702/191 |
| 8,160,368 | B2 * | 4/2012 | Nakamura | H04N 19/63 |
| | | | | 382/232 |
| 8,306,756 | B2 * | 11/2012 | Utsunomiya | C12Q 1/6869 |
| | | | | 702/20 |
| 8,634,640 | B2 * | 1/2014 | Bhatti | H04N 1/6066 |
| | | | | 382/167 |
| 8,743,137 | B2 * | 6/2014 | Peters | G01J 3/52 |
| | | | | 345/589 |
| 9,610,018 | B2 * | 4/2017 | Gulati | A61B 5/02416 |
| 9,933,305 | B2 * | 4/2018 | Goldring | G01J 3/0216 |
| 10,203,246 | B2 * | 2/2019 | Rosen | G01J 3/0275 |
| 10,254,215 | B2 * | 4/2019 | Wilk | G01J 3/0208 |
| 10,323,982 | B2 * | 6/2019 | Goldring | G01J 3/0256 |
| 10,330,531 | B2 * | 6/2019 | Goldring | G01J 3/0256 |
| 10,436,028 | B2 * | 10/2019 | Dai | G01N 21/314 |
| 10,493,789 | B2 * | 12/2019 | Dorier | G06K 7/10722 |
| 10,502,679 | B2 * | 12/2019 | Aphek | G01J 3/0272 |
| 10,791,933 | B2 * | 10/2020 | Goldring | A61B 5/0022 |
| 10,927,672 | B2 * | 2/2021 | Dai | G06N 3/08 |
| 11,067,443 | B2 * | 7/2021 | Goldring | G01J 3/0272 |
| 2003/0020908 | A1 * | 1/2003 | Frost | G01N 21/6456 |
| | | | | 250/458.1 |
| 2005/0059046 | A1 * | 3/2005 | LaBrenz | G16B 30/00 |
| | | | | 204/450 |
| 2005/0161328 | A1 * | 7/2005 | Liu | G01N 27/44721 |
| | | | | 204/600 |
| 2007/0242877 | A1 * | 10/2007 | Peters | G01J 3/46 |
| | | | | 382/167 |
| 2008/0018898 | A1 * | 1/2008 | Gunstream | G01N 21/274 |
| | | | | 356/402 |
| 2009/0001262 | A1 * | 1/2009 | Visser | G06K 9/6242 |
| | | | | 250/281 |
| 2009/0301884 | A1 * | 12/2009 | Liu | G06V 20/69 |
| | | | | 204/600 |
| 2010/0010748 | A1 * | 1/2010 | Perlin | C12Q 1/6809 |
| | | | | 702/19 |
| 2010/0089771 | A1 * | 4/2010 | Utsunomiya | C12Q 1/6869 |
| | | | | 205/777.5 |
| 2011/0232356 | A1 * | 9/2011 | Liu | G01N 27/44721 |
| | | | | 204/600 |
| 2012/0099788 | A1 * | 4/2012 | Bhatti | H04N 1/6036 |
| | | | | 382/167 |
| 2015/0182118 | A1 * | 7/2015 | Bradbury | A61P 9/00 |
| | | | | 600/431 |
| 2016/0097716 | A1 * | 4/2016 | Gulati | A61B 5/1495 |
| | | | | 250/340 |
| 2018/0361778 | A1 * | 12/2018 | Dorier | B42D 25/387 |
| 2019/0032126 | A1 * | 1/2019 | Kawaguchi | C12N 15/09 |
| 2019/0063215 | A1 * | 2/2019 | Dai | E21B 49/08 |
| 2019/0087537 | A1 * | 3/2019 | Perlin | G16B 20/20 |
| 2019/0353613 | A1 * | 11/2019 | King | G16B 45/00 |
| 2019/0360332 | A1 * | 11/2019 | Dai | E21B 49/08 |
| 2020/0003728 | A1 * | 1/2020 | Majumdar | G01N 27/44791 |
| 2021/0004989 | A1 * | 1/2021 | Tanaka | H04N 1/6086 |
| 2021/0310951 | A1 | 10/2021 | Kawaguchi et al. | |

OTHER PUBLICATIONS

German Office Action dated Aug. 11, 2022 for German Patent Application No. 112019003466.9.

* cited by examiner

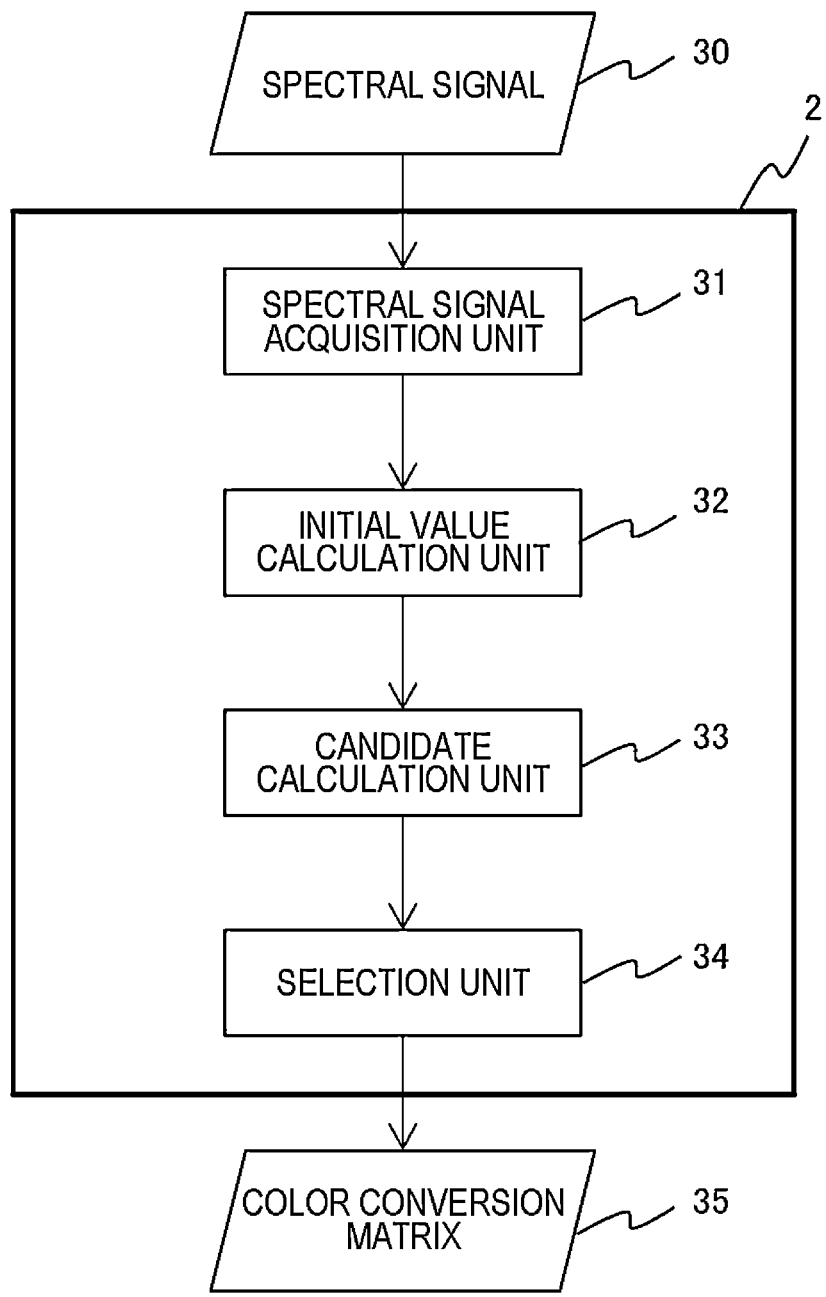

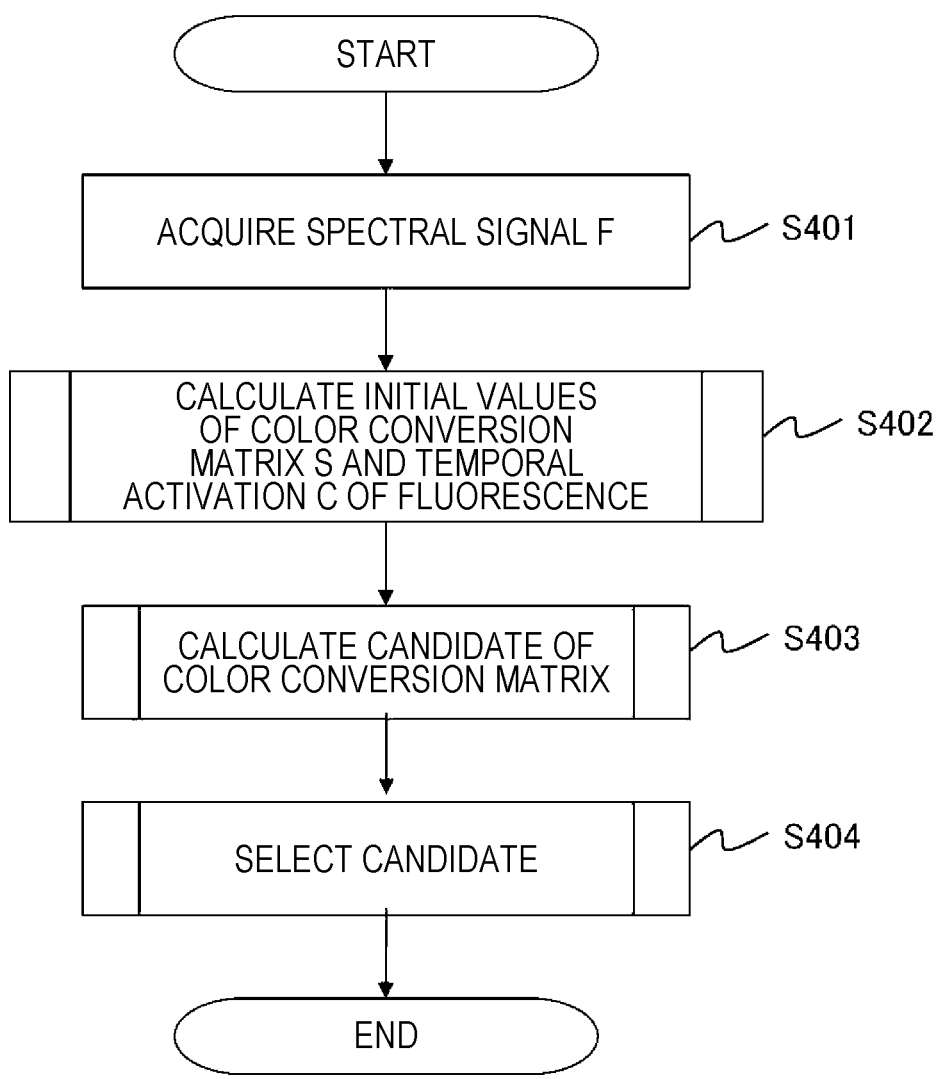

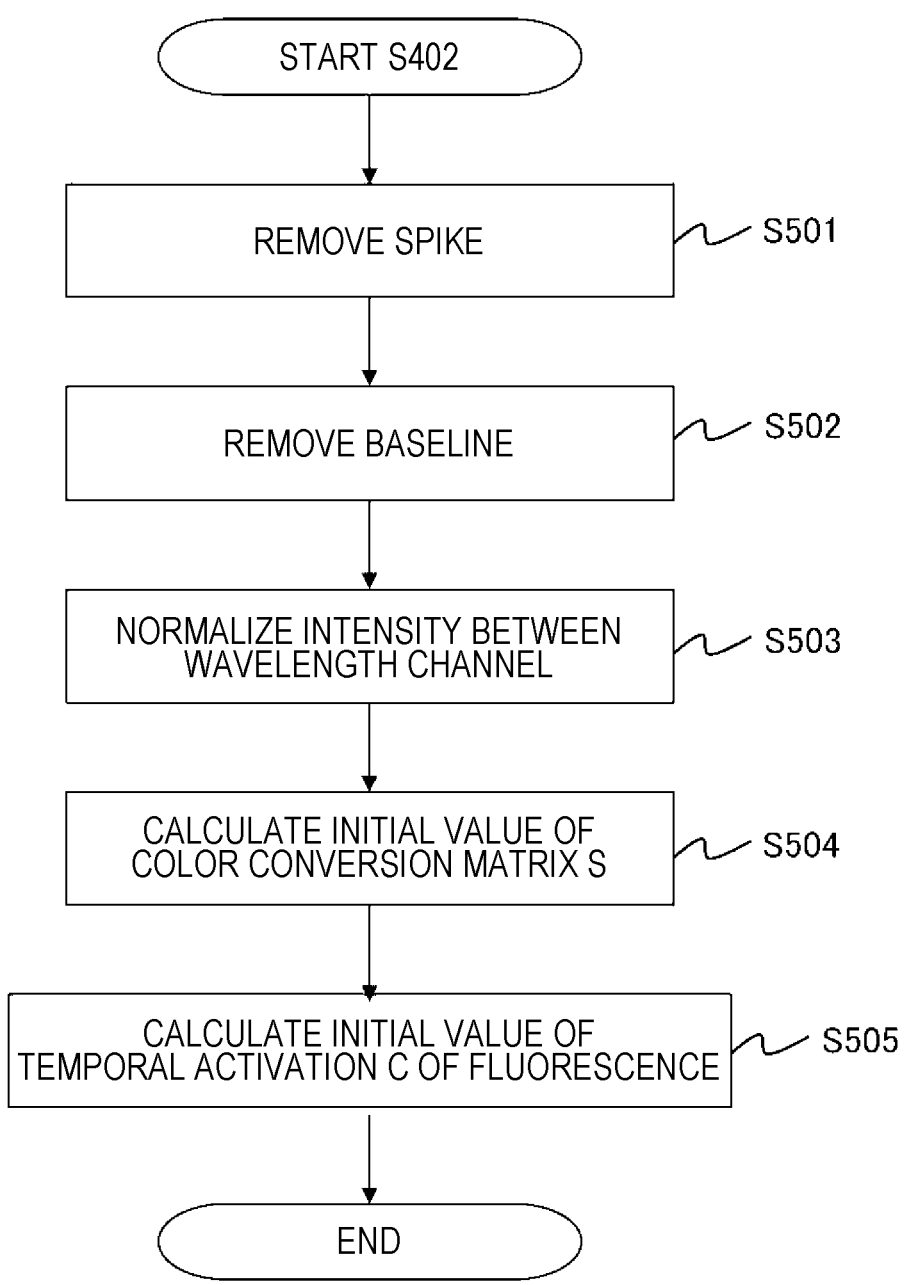

SPECTRAL CALIBRATION APPARATUS AND SPECTRAL CALIBRATION METHOD

TECHNICAL FIELD

The present invention relates to a spectral calibration apparatus and a spectral calibration method for a capillary electrophoresis type sequencer.

BACKGROUND ART

The capillary electrophoresis type sequencer is a device which disperses the fluorescence generated by irradiation with excitation light to detect it over time while electrophoresing a nucleic acid sample in a fine tube called a capillary, and analyzes a nucleic acid using a detected signal. Specifically, a sequencing process for determining the base sequence constituting a nucleic acid and a fragment analysis process for comparing the strand lengths of DNA fragments are performed. Color conversion processing is performed in the sequencing process and the fragment analysis process. The color conversion processing is a process of converting the time series data of the spectral signal into the time series data of fluorescence of the fluorescent dye that labels the nucleic acid sample, and multiplying the time-series data of the detected signal by a pseudo-inverse matrix of the color conversion matrix corresponding to spectral responsiveness of each fluorescent dye.

The process of acquiring a color conversion matrix is called spectral calibration, and PTL 1 discloses a spectral calibration method using an electrophoretogram generated from a plurality of molecular chemical species whose spectra can be identified. That is, a region having spectral responsiveness is identified by rank analysis of a part of the data matrix generated from the electrophoretogram, the pure component spectral response determined from the identified region is divided into clusters, and a representative spectrum of each cluster and a molecular species are correlated.

CITATION LIST

Patent Literature

PTL 1: WO 01/055699

SUMMARY OF INVENTION

Technical Problem

However, PTL 1 assumes that the peaks representing the fluorescent dyes are sufficiently separated in the time domain of the electrophoretogram, and the accuracy of spectral calibration decreases when the peaks appear simultaneously between the fluorescent dyes. In a capillary electrophoresis type sequencer, a capillary becomes shorter as the device is miniaturized, so that it becomes difficult for the bases to be separated in the capillary, and the overlap of the peaks of the detected signals increases.

Therefore, an object of the invention is to provide a spectral calibration apparatus and a spectral calibration method capable of performing spectral calibration with high accuracy even when peaks appear simultaneously between fluorescent dyes.

Solution to Problem

In order to achieve the above object, the invention provides a spectral calibration apparatus for calculating a color conversion matrix used in color conversion processing. The spectral calibration apparatus includes a spectral signal acquisition unit that acquires a spectral signal of fluorescence detected over time, a candidate calculation unit that calculates a candidate of the color conversion matrix for each value of a parameter, which depends on a frequency at which fluorescence peaks of fluorescent dyes appear at the same time, based on the spectral signal, and a selection unit that selects a color conversion matrix based on an evaluation value calculated for each candidate.

The invention provides a spectral calibration method for calculating a color conversion matrix used in color conversion processing. The spectral calibration method includes acquiring a spectral signal of fluorescence detected over time, calculating a candidate of the color conversion matrix for each value of a parameter, which depends on a frequency at which a fluorescence peak of a fluorescent dye appears, based on the spectral signal, and selecting a color conversion matrix based on an evaluation value which is calculated for each candidate.

Advantageous Effects of Invention

According to the invention, it is possible to provide a spectral calibration apparatus and a spectral calibration method capable of performing spectral calibration with high accuracy even when peaks appear simultaneously between fluorescent dyes.

BRIEF DESCRIPTION OF DRAWINGS

FIG. 3 is a functional block diagram of a first embodiment.

FIG. 4 is a diagram illustrating an example of a process flow of the first embodiment.

FIG. 5 is a diagram illustrating an example of a flow of calculation processing of an initial value in the first embodiment.

DESCRIPTION OF EMBODIMENTS

Figure 1:
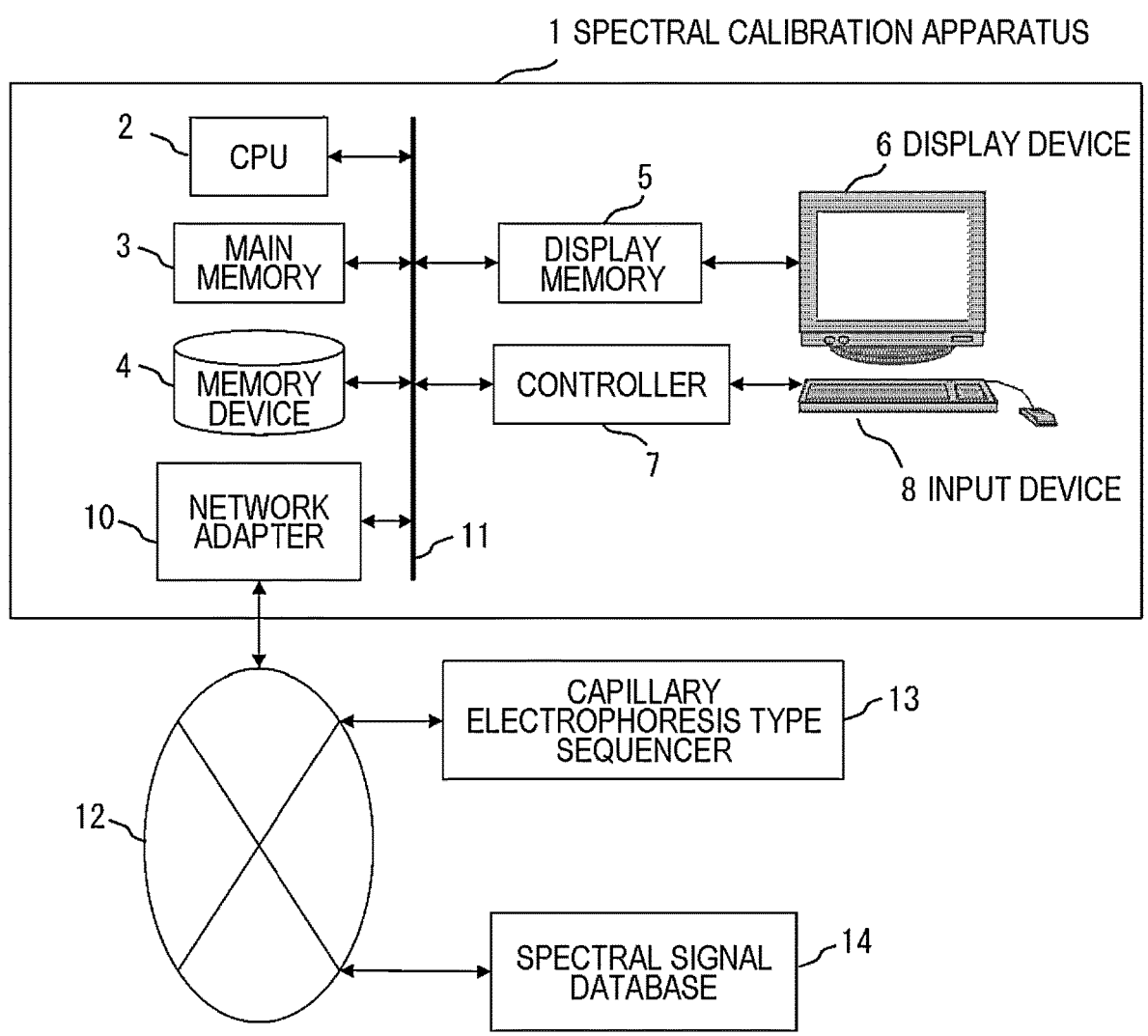
FIG. 1 is a hardware configuration diagram of a spectral calibration apparatus.

Hereinafter, preferred embodiments of a spectral calibration apparatus and a spectral calibration method according to the invention will be described with reference to the accompanying drawings. In the following description and the accompanying drawings, components having the same functional configuration will be designated by the same reference numerals, and duplicate description will be omitted.

First Embodiment

FIG. 1 is a diagram illustrating a hardware configuration of a spectral calibration apparatus 1. In the spectral calibration apparatus 1, a CPU (Central Processing Unit) 2, a main memory 3, a memory device 4, a display memory 5, a display device 6, a controller 7, an input device 8, and a network adapter 10 are connected by a system bus 11 so as to be able to transmit and receive signals. The spectral calibration apparatus 1 is connected to a capillary electrophoresis type sequencer 13 and a spectral signal database 14 via a network 12 so as to be able to transmit and receive signals. Here, "to be able to transmit and receive signals" indicates a state in which signals can be transmitted and received to each other or from one to the other regardless of whether they are electrically or optically wired or wireless.

The CPU 2 is a device that controls the operation of each component. The CPU 2 loads a program stored in the memory device 4 and the data necessary for executing the program into the main memory 3 and executes the program. The memory device 4 is a device that stores a program executed by the CPU 2 and data necessary for executing the program, and specifically, a recording device such as a hard disk or SSD (Solid State Drive), and a device which reads and writes to a recording medium such as an IC card, an SD card, and a DVD. Various data is transmitted and received via the network 12 such as LAN (Local Area Network). The main memory 3 stores the program executed by the CPU 2 and the progress of arithmetic processing.

The display memory 5 temporarily stores display data for displaying on the display device 6 such as a liquid crystal display. The input device 8 is an operation device in which an operator gives an operation instruction to the spectral calibration apparatus 1, and specifically, a keyboard, a mouse, or the like. The mouse may be another pointing device such as a trackpad or trackball. The controller 7 detects the state of the keyboard and mouse and outputs the detected information and the like to the CPU 2. When the display device 6 is a touch panel, the touch panel also functions as the input device 8. The network adapter 10 is for connecting the spectral calibration apparatus 1 to the network 12 such as a LAN, a telephone line, or the Internet.

The capillary electrophoresis type sequencer 13 is a device which disperses the fluorescence generated by irradiation with excitation light to detect it over time while electrophoresing a nucleic acid sample in the capillary, and analyzes a nucleic acid using a spectral signal which is the detected signal. Nucleic acid analysis involves color conversion processing that converts the spectral signal into time-series data of the fluorescence of the fluorescent dye that labels the nucleic acid sample by multiplying the spectral signal by a pseudo-inverse matrix of the color conversion matrix. The spectral signal database 14 is a database system that stores the spectral signals acquired by the capillary electrophoresis type sequencer 13.

Figure 2A:
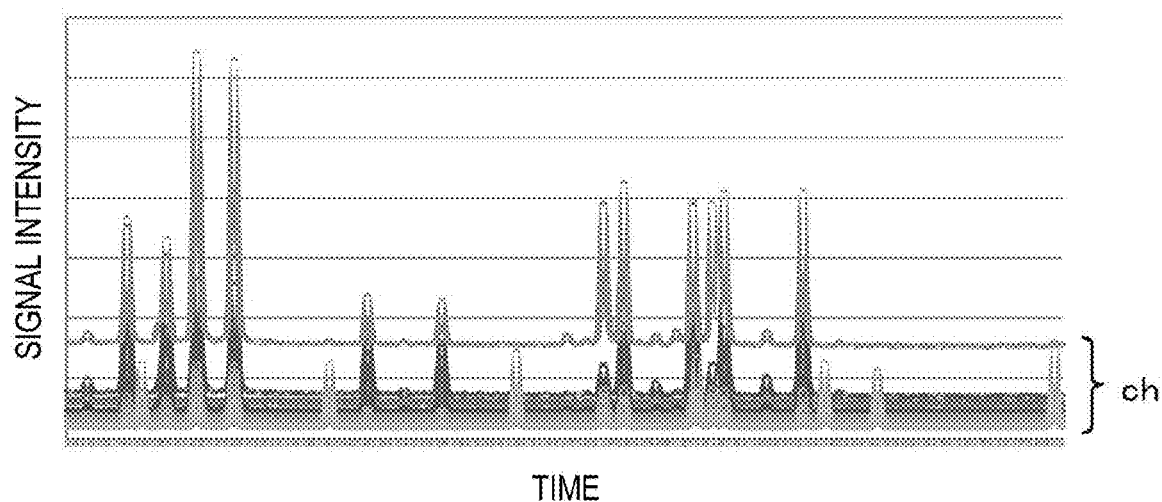
FIGS. 2A and 2B are diagrams for explaining an example of a detected spectral signal and a relationship among a spectral signal, a color conversion matrix, and a temporal activation of fluorescence.

The relationship among the spectral signal, the color conversion matrix, and the temporal activation of fluorescence will be described with reference to FIG. 2. FIG. 2A illustrates an example of the detected spectral signal, in which the vertical axis represents the signal intensity and the horizontal axis represents time, and the waveform for each detection channel corresponding to the dispersed wavelength is illustrated.

Figure 2B:
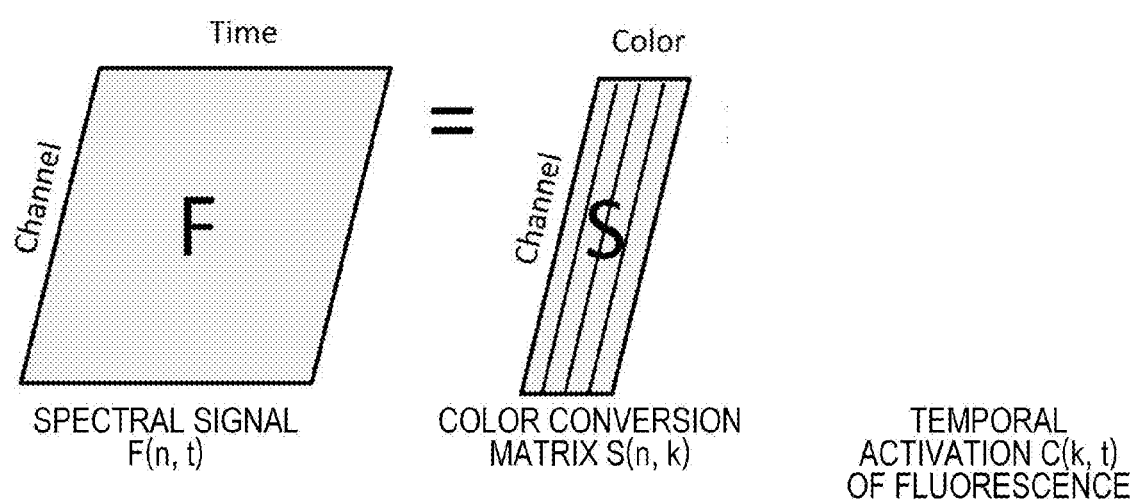

FIG. 2B is a diagram illustrating the relationship among a spectral signal F, a color conversion matrix S, and a temporal activation C of fluorescence. Nucleic acid samples that move in the capillary by electrophoresis contain four types of bases A (adenine), G (guanine), C (cytosine), and T (thymine), and the base sequence in the nucleic acid sample can be grasped by knowing the movement order of each base. Since different fluorescent dyes correspond to each base, the base sequence can be determined by knowing the movement order of each base from the temporal activation C of fluorescence of each fluorescent dye.

The spectral signal F detected by the capillary electrophoresis type sequencer 13 is the result of spectroscopically detecting the temporal activation C of fluorescence without dividing it for each fluorescent dye. Therefore, when the color conversion matrix S is used, it becomes $F=S \times C$. In other words, in order to obtain the temporal activation C of fluorescence from the spectral signal F, it is sufficient to multiply both sides by $S^+$, which is a pseudo-inverse matrix of S, to calculate $C=S^+ \times F$, so there needs spectral calibration which is a process of acquiring the color conversion matrix S. F is the matrix of the row of a wavelength channel number n and the column of the time number t, S is the matrix of the row of the wavelength channel number n and the column of the fluorescent dye number k, and C is the matrix of the row of the fluorescent dye number k and the column of the time number t.

Although there is a known method for performing independent component analysis on the spectral signal F in order to acquire the color conversion matrix S, the accuracy of the obtained color conversion matrix S is insufficient. By the way, since different fluorescent dyes are labeled on each base, the frequency at which the fluorescence peaks of fluorescent dyes appear at the same time is low. Therefore, in this embodiment, a plurality of candidates of the color conversion matrix S in which the frequency at which the fluorescence peaks of fluorescent dyes appear at the same time at the temporal activation C of fluorescence are low are calculated, and the color conversion matrix S is selected from the plurality of candidates based on the evaluation value calculated for each candidate.

The main parts of this embodiment will be described with reference to FIG. 3. Note that these main parts may be composed of dedicated hardware or software running on the CPU 2. In the following description, the case where the main part of this embodiment is composed of software will be described. This embodiment includes a spectral signal acquisition unit 31, an initial value calculation unit 32, a candidate calculation unit 33, and a selection unit 34.

Hereinafter, this part will be described.

The spectral signal acquisition unit 31 acquires a spectral signal 30 used for spectral calibration. The spectral signal 30 may be a signal stored in the memory device 4, or may be a signal acquired from the capillary electrophoresis type sequencer 13 or the spectral signal database 14 via the network adapter 10.

The initial value calculation unit 32 calculates the initial values of the color conversion matrix S and the temporal activation C of fluorescence. The spectral signal 30 is used to calculate the initial value, and some preprocessing may be performed prior to the calculation of the initial value. As the preprocessing, for example, spike removal, baseline removal, normalization between wavelength channels, and the like are performed, so that the accuracy in the subsequent processing can be improved. A known independent component analysis is used to calculate the initial value of the color conversion matrix S. The initial value of the temporal activation C of fluorescence is calculated using the initial value of the color conversion matrix S and the spectral signal F.

The candidate calculation unit 33 calculates the candidates of the color conversion matrix S. In the calculation of the candidates of the color conversion matrix S, a parameter λ that depends on the frequency of simultaneous appearance, which is the frequency at which the fluorescence peaks of the fluorescent dye appear at the same time, is used in the temporal activation C of fluorescence. The parameter λ has a negative correlation with the frequency of simultaneous appearance. That is, when the parameter λ is small, the frequency of simultaneous appearance increases, and when the parameter λ is large, the frequency of simultaneous appearance decreases. Candidates for the color conversion matrix S are calculated for each value of the parameter λ.

The selection unit 34 selects a color conversion matrix from the candidates calculated for each value of the parameter λ based on the evaluation value calculated for each candidate. The evaluation value calculated for each candidate is calculated based on, for example, an element of the temporal activation C of fluorescence calculated using each candidate of the color conversion matrix. Since it is physically impossible for the element of the temporal activation C of fluorescence to have a negative value, a cost function having a low evaluation value is used as a candidate for such a color conversion matrix.

An example of the flow of processing executed by the spectral calibration apparatus 1 including each of the above parts will be described with reference to FIG. 4. Hereinafter, each step will be described.

(S401)

The spectral signal acquisition unit 31 acquires the spectral signal 30. The spectral signal 30 may be acquired from the memory device 4, or may be acquired from the capillary electrophoresis type sequencer 13 or the spectral signal database 14. The spectral signal 30 is a matrix consisting of the row having the wavelength channel number n and the column having a time number t, and each element is x(t, n). Further, $1 \leq t \leq T$, where T is a number representing the number of points at the detection time, for example, T=1000. Further, $1 \leq n \leq N$, where N is a number representing the number of wavelength channels, for example N=20.

(S402)

The initial value calculation unit 32 calculates the initial values of the color conversion matrix S and the temporal activation C of fluorescence from the spectral signal 30. The color conversion matrix S is a matrix consisting of the row of the wavelength channel number n and the column of fluorescent dye number k, and each element is s(n, k). Further, $1 \leq k \leq K$, where K is a number representing the number of fluorescent dyes, for example, K=4. Further, the temporal activation C of fluorescence is a matrix consisting of the row of fluorescent dye number k and the column of time number t.

An example of the process flow for calculating the initial values of the color conversion matrix S and the temporal activation C of fluorescence is shown in FIG. 5, and each step in FIG. 5 will be described below.

(S501)

The initial value calculation unit 32 removes the spike signal from the spectral signal 30. The removal of the spike signal is performed, for example, by the following procedure.

(1) First, the difference signal v (t, n) in the time direction of x(t, n) is calculated by [Math. 1].

$$v(t,n) = x(t,n) - x(t-1,n) \quad \text{[Math. 1]}$$

(2) Set Δ=Δ_max. In addition, Δ_max is the maximum value of the time number, Δ_min is the minimum value of the time number, Δ_tol is the tolerance of the time number, θ1 is the threshold value of the spectral signal x(t, n), and θ2 is the threshold of the difference signal v (t, n).

(3) Search for p that satisfies [Math. 2], and if there is such p, replace x(t, n) in the range of $t \in [p-\Delta\_tol, p+\Delta+\Delta\_tol]$ with 0.

$$\frac{1}{\Delta} \sum_{t \in [p, p+\Delta]} \sum_n x(t, n) > \theta_1 \quad \text{[Math. 2]}$$

and $$\sum_n v(p, n) > \theta_2$$

and $$\sum_n v(p + \Delta, n) < -\theta_2$$

(4) Decrease 1 from Δ, and if Δ<Δ_min, end, otherwise return to (3).

By the above procedure, the spectral signal x(t, n) from which the spike signal is removed is acquired. When the spectral signal includes a spike signal, it is preferable to remove the spike signal in order to reduce the accuracy of the subsequent processing.

(S502)

The initial value calculation unit 32 removes the baseline from the calculation result x(t, n) of S501. For the removal of the baseline, a known method such as subtracting the minimum value of the neighborhood section at each time t from x(t, n) is used. The signal from which the baseline has been removed is set to z(t, n).

(S503)

The initial value calculation unit 32 normalizes the intensity between wavelength channels with respect to the calculation result z(t, n) of S502. [Math. 3] and [Math. 4] are used for the normalization process, and a normalization signal f(t, n) is acquired.

$$\sigma(n) = \sqrt{\frac{1}{T} \sum_{t=1}^{T} z(t, n)^2} \quad \text{[Math. 3]}$$

$$f(t, n) = \frac{z(t, n)}{\sigma(n)} \quad \text{[Math. 4]}$$

If there is a large difference in intensity between the wavelength channels, the wavelength channel with high intensity is overestimated and the wavelength channel with low intensity is underestimated, which lowers the accuracy of the subsequent processing. Therefore, it is preferable to normalize the intensity between wavelength channels.

Note that S501 to S503 are preprocessing for subsequent processing and do not necessarily have to be executed. However, it is preferably executed in order to improve the calculation accuracy of the subsequent processing.

(S504)

The initial value calculation unit 32 calculates the initial value of the color conversion matrix S by independent component analysis. It is preferable to use the calculation result f(t, n) of S503 for the input of the independent component analysis. In the independent component analysis, a known method such as Fast ICA, Auxiliary-function-based ICA, and Natural-gradient-based ICA is used.

Prior to the independent component analysis, the difference signal g(t, n)=f(t, n)−f(t−1, n) in the time direction is calculated from the normalization signal f(t, n), and the difference signal g(t, n) may be used for the independent component analysis. The independent component analysis assumes that the input signal follows the distribution of zero mean. Since the difference signal g(t, n) follows the distribution of zero mean, the independent component analysis can function effectively. For the same reason, the signal obtained by subtracting the average value of the normalization signal f(t, n) from the normalization signal f(t, n) may be used for the independent component analysis.

Further, each element b(n, k) obtained by subjecting each element a(n, k) of the color conversion matrix S obtained by the independent component analysis to non-negative processing may be used as the initial value of the color conversion matrix S. For example, [Math. 5] is used for the non-negative processing.

$$b(n,k)=|a(n,k)| \qquad \text{[Math. 5]}$$

In addition, as other non-negative processing, processing of subtracting the minimum value of a(n, k) from each a(n, k) and processing of replacing the negative value in a(n, k) with zero are performed. The initial value of the color conversion matrix S may be calculated. The calculated initial value of the color conversion matrix S(n, k) is stored in the memory device 4 or the like.

(S505)

The initial value calculation unit 32 calculates the initial value of the temporal activation C of fluorescence using the calculation result of S504. [Math. 6] is used to calculate the initial value of C.

$$C=S^+F \qquad \text{[Math. 6]}$$

Note that $S^+$ is a pseudo-inverse matrix of S, and F is a matrix whose elements are the normalization signals f(t, n). The calculated initial value of the temporal activation C(k, t) of fluorescence is stored in the memory device 4 or the like.

Returning to the explanation of FIG. 4.

(S403)

The candidate calculation unit 33 calculates the candidates of the color conversion matrix. The candidates for the color conversion matrix are calculated for each value of the parameter λ, which depends on the frequency of simultaneous appearance of the fluorescence peaks of the fluorescent dye at the temporal activation C of fluorescence. The parameter λ is set to, for example, 1.01, 1.02, . . . , 1.10.

Figure 6:
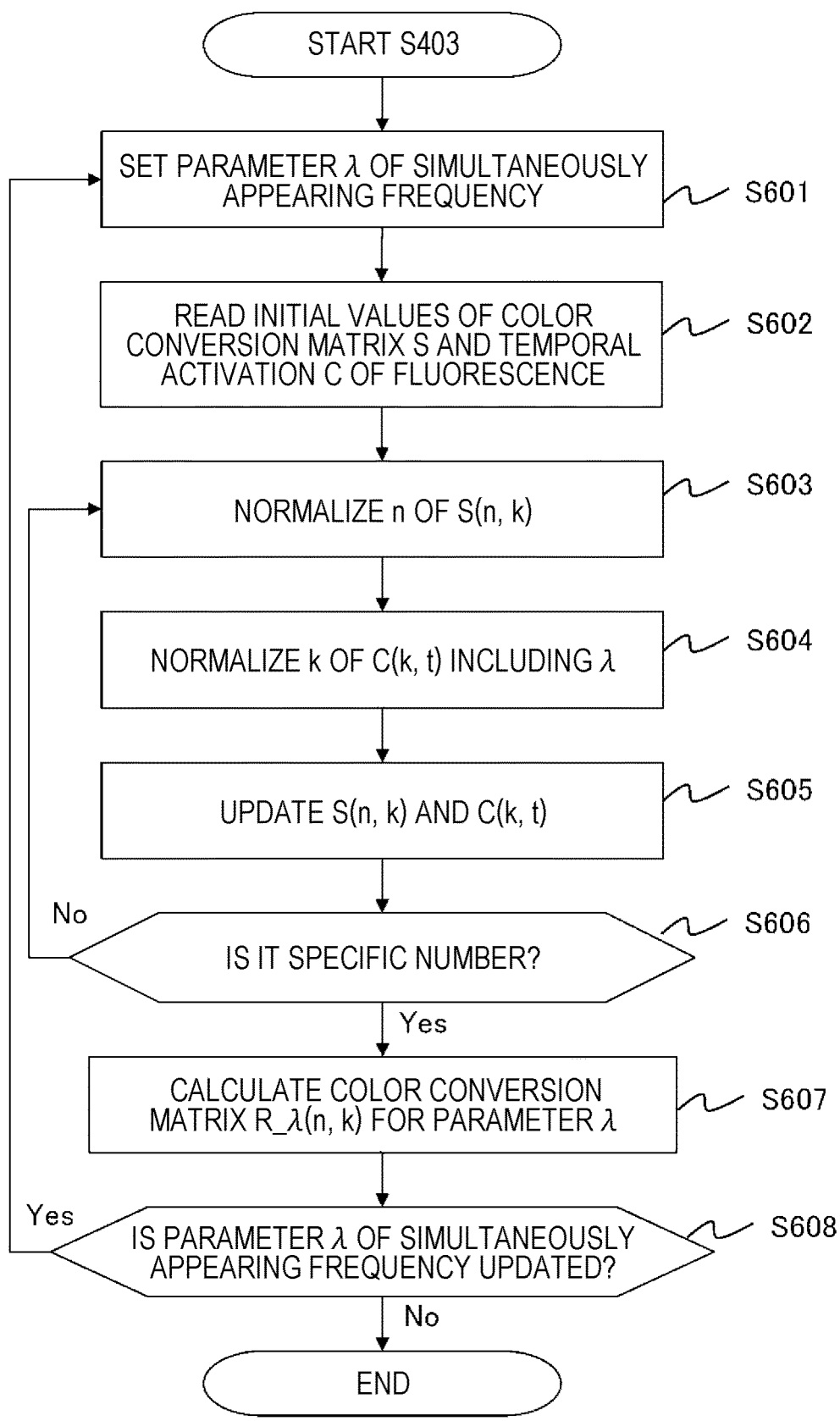
FIG. 6 is a diagram illustrating an example of a flow of calculation processing of a candidate for a color conversion matrix according to the first embodiment.

An example of the process flow for calculating the candidates of the color conversion matrix is shown in FIG. 6, and each step in FIG. 6 will be described below.

(S601)

The candidate calculation unit 33 sets a parameter λ that depends on the frequency with which the fluorescence peaks of the fluorescent dye appear at the same time. For example, λ=1.01 is set.

(S602)

The candidate calculation unit 33 reads out the initial values of the color conversion matrix S(n, k) and the temporal activation C(k, t) of fluorescence from the memory device 4 or the like.

(S603)

The candidate calculation unit 33 normalizes the color conversion matrix S(n, k) with respect to the wavelength channel number n. For example, [Math. 7] is used for normalization, and P(n|k) is calculated as a result of the normalization.

$$P(n|k) = \frac{S(n, k)}{\sum_n S(n, k)} \qquad \text{[Math. 7]}$$

Further, [Math. 8] may be used instead of [Math. 7].

$$P(n|k) = \frac{S(n, k) - \xi \sum_{k'} P(n|k')}{\sum_n \left( S(n, k) - \xi \sum_{k'} P(n|k') \right)}, \qquad \text{[Math. 8]}$$

here, $\xi$ is specified positive number.

When [Math. 8] is used, the similarity between the wavelength responsiveness of each fluorescent dye corresponding to each column of the color conversion matrix S(n, k) can be adjusted by ξ.

(S604)

The candidate calculation unit 33 normalizes the temporal activation C(k, t) of fluorescence including the parameter λ with respect to the fluorescent dye number k. For example, [Math. 9] is used for normalization, and P(k|t) is calculated as a result of the normalization.

$$P(k|t) = \frac{\tilde{C}(k, t)}{\sum_k \tilde{C}(k, t)}, \quad \text{here, } \tilde{C}(k|t) = \left( \frac{C(k, t)}{\sum_k C(k, t)} \right)^\lambda \qquad \text{[Math. 9]}$$

Given a parameter λ greater than 1.0 and using [Math. 9], the frequency of simultaneous appearances is suppressed according to the magnitude of the parameter λ, and the color conversion matrix S(n, k) and the temporal activation C(k, t) of fluorescence in the next step are updated.

Further, [Math. 10] or [Math. 11] may be used instead of [Math. 9].

$$P(k|t) = \frac{\tilde{C}(k, t)}{\sum_k \tilde{C}(k, t)}, \quad \text{here, } \tilde{C}(k|t) = \frac{C(k, t)}{\sum_k C(k, t) + \lambda} \qquad \text{[Math. 10]}$$

$$P(k|t) = \frac{\tilde{C}(k, t)}{\sum_k \tilde{C}(k, t)}, \quad \text{here, } \tilde{C}(k|t) = \max\left( \frac{C(k, t)}{\sum_k C(k, t)} - \lambda, 0 \right) + \varepsilon, \qquad \text{[Math. 11]}$$

ε is sufficiently small positive number.

When [Math. 10] or [Math. 11] is used, it is easy to update to the temporal activation C(k, t) of fluorescence with a small intensity and few peaks, so that a highly accurate result can be obtained when the noise is large.

(S605)

The candidate calculation unit 33 updates the color conversion matrix S(n, k) and the temporal activation C(k, t) of fluorescence. [Math. 12] and [Math. 13] are used to update the color conversion matrix S(n, k), and [Math. 12] and [Math. 14] are used to update the temporal activation C(k, t) of fluorescence.

$$P(k|t, n) = \frac{P(n|k)P(k|t)}{\sum_{k'} P(n|k')P(k'|t)} \quad \text{[Math. 12]}$$

$$S(n, k) = \sum_t F(n, t)P(k|t, n) \quad \text{[Math. 13]}$$

$$C(k, t) = \sum_n F(n, t)P(k|t, n) \quad \text{[Math. 14]}$$

(S606)
The candidate calculation unit 33 determines whether the specified number of times has been reached, and if it reaches, the process proceeds to S607, and if not, the process returns to S603.

(S607)
The candidate calculation unit 33 calculates the color conversion matrix R_λ(n, k)=σ(n)S(n, k) for the parameter λ set in S601. By multiplying S(n, k) by σ(n) used in the wavelength channel intensity normalization process, the color conversion matrix R_λ(n, k) corresponding to the signal z(t, n) before the normalization process is obtained.

(S608)
The candidate calculation unit 33 determines whether to update the parameter λ, and if it updates, the process returns to S601 to reset the parameter λ, for example, λ=1.02, and if it does not update, the process of S403 ends. The parameter λ is set in the order of, for example, 1.01, 1.02, . . . , 1.10.

In S403, the candidate calculation unit 33 may calculate the candidate of the color conversion matrix by using Bayesian estimation. That is, the color conversion matrix S(n, k) that maximizes a posterior probability defined by [Math. 15] and the temporal activation C(k, t) of fluorescence are obtained by using a known Markov Chain Monte Carlo such as Gibbs sampling and Metropolis-Hastings sampling.

$$p(S, C|F, \Theta) = \quad \text{[Math. 15]}$$
$$\prod_t \prod_n \text{Normal}\left(f(t, n); \sum_k S(n, k)C(k, t), \sigma_{noise}^2\right) \times$$
$$\prod_n \prod_k \text{Gamma}(S(n, k); \alpha k, \beta k) \times \prod_t \prod_k \text{Gamma}(C(k, t); 1.0, \lambda)$$

here, $\Theta = (\sigma_{noise}^2, \alpha k, \beta k, \lambda)$

Here, αk and βk are parameters of the gamma distribution. When Bayesian estimation is used, the problem of initial value dependence can be solved, so that a highly accurate color conversion matrix can be obtained.

Returning to the explanation of FIG. 4.

Figure 7:
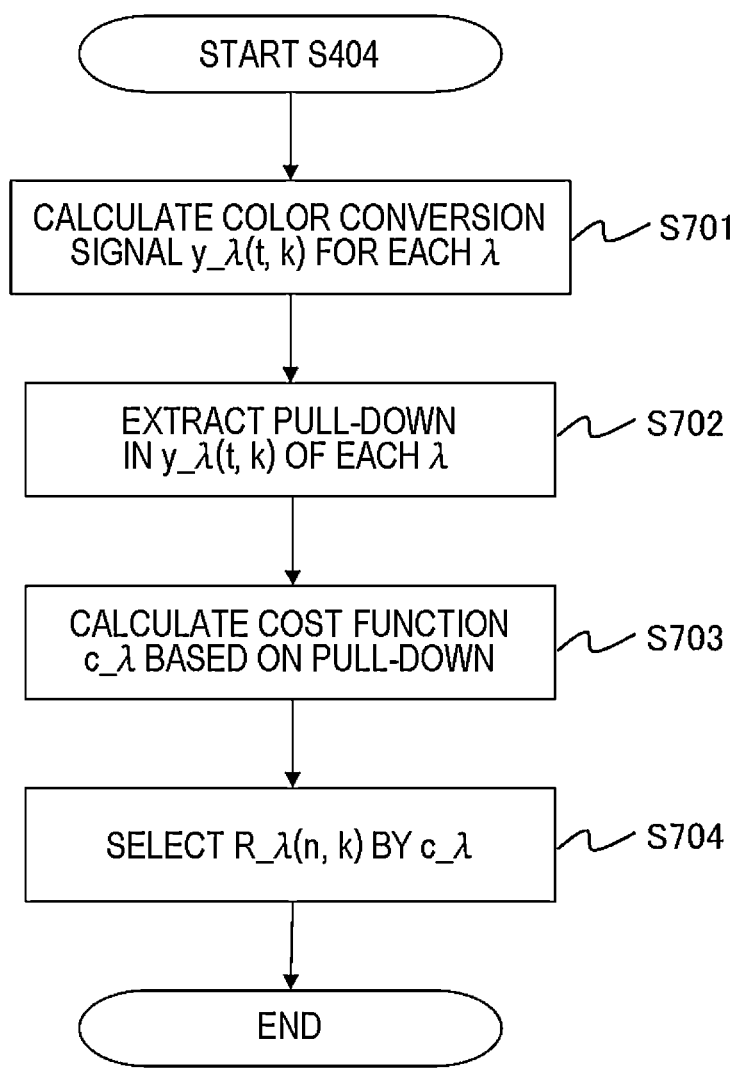
FIG. 7 is a diagram illustrating an example of a flow of candidate selection processing of the first embodiment.

(S404)
The selection unit 34 selects a color conversion matrix from a plurality of candidates R_λ(n, k) of the color conversion matrix calculated in S403 based on the evaluation value calculated for each candidate. An example of the process flow of selecting the color conversion matrix from the candidates is shown in FIG. 7, and each step of FIG. 7 will be described below.

(S701)
The selection unit 34 calculates the color conversion signal y_λ(t, k) for each parameter λ. The color conversion signal y_λ(t, k) is calculated by [Math. 16] using the candidate R_λ(n, k) of the color conversion matrix and the signal z(t, n) before the normalization process.

$$Y_\lambda = R_\lambda^+ Z \quad \text{[Math. 16]}$$

$Y_\lambda$ is a matrix whose elements are the color conversion signal y_λ(t, k), $R_\lambda^+$ is a pseudo-inverse matrix of the candidate R_λ(n, k) of the color conversion matrix, and Z is a matrix whose elements are signals z(t, n) before the normalization process.

(S702)
The selection unit 34 extracts the pull-down in the color conversion signal y_λ(t, k) calculated in S701. When the color conversion signal y_λ(t, k) of one fluorescent dye has a sufficiently large peak at a certain time, the negative value peak of the color conversion signal y_λ(t, k) of another fluorescent dye at the same time is called "pull-down". The pull-down cannot occur physically and is caused by an error included in the candidate R_λ(n, k) of the color conversion matrix used for calculating the color conversion signal y_λ(t, k). Therefore, in this step, the pull-down included in the color conversion signal y_λ(t, k) is extracted, and each candidate R_λ(n, k) of the color conversion matrix is evaluated in the next and subsequent steps based on the extracted pull-down. If the candidate R_λ(n, k) of the color conversion matrix contains an error, a pull-up that is a positive peak occurs along with a pull-down, but this is not dealt with in this embodiment.

The pull-down in the color conversion signal y_λ(t, k) is extracted by searching for a time when the color conversion signal y_λ(t, k) of each fluorescent dye is a negative value, and the difference value y_λ(t, k)−y_λ(t−1, k) in the time direction of y_λ(t, k) changes from negative to positive.

(S703)
The selection unit 34 calculates the cost function c_λ based on the pull-down extracted in S702. For example, [Math. 17] is used to calculate the cost function c_λ.

$$c\_\lambda = \left| \frac{\sum_m dm}{\sum_m em} - D \right| \quad \text{[Math. 17]}$$

Here, m is the number of the extracted pull-down, dm is the absolute value of the intensity of each pull-down, em is the maximum intensity of other fluorescent dyes at the same time as the pull-down, and D is the predetermined tolerance of the pull-down. According to [Math. 17], the calculation error due to division by zero can be avoided by performing the division operation by the sum of the maximum intensities.

The cost function c_λ based on the pull-down is not limited to [Math. 17], and may be a function capable of evaluating the total area of the pull-down.

(S704)
The selection unit 34 selects the color conversion matrix R_λ(n, k) from the candidates by the cost function c_λ calculated in S703. When the cost function c_λ is [Math. 17], the color conversion matrix R_λ(n, k) that minimizes the cost function c_λ is selected.

According to the process flow described above, an appropriate color conversion matrix R_λ(n, k) can be obtained even when peaks appear simultaneously between the fluorescent dyes. That is, even when the time resolution of the spectral signal is low or the frequency of fluorescence peaks overlapping between different fluorescent dyes is high, spectral calibration can be performed with high accuracy. In

Second Embodiment

In the first embodiment, it has been described that the color conversion matrix R_λ(n, k) is selected by using the cost function c_λ based on the pull-down in the color conversion signal y_λ(t, k). In this embodiment, it will be described that the cost function c_λ based on the deconvolution signal obtained by subjecting the color conversion signal y_λ(t, k) to the deconvolution processing is used. Since the overall configuration of this embodiment is the same as that of the first embodiment, the description thereof will be omitted.

Figure 8:
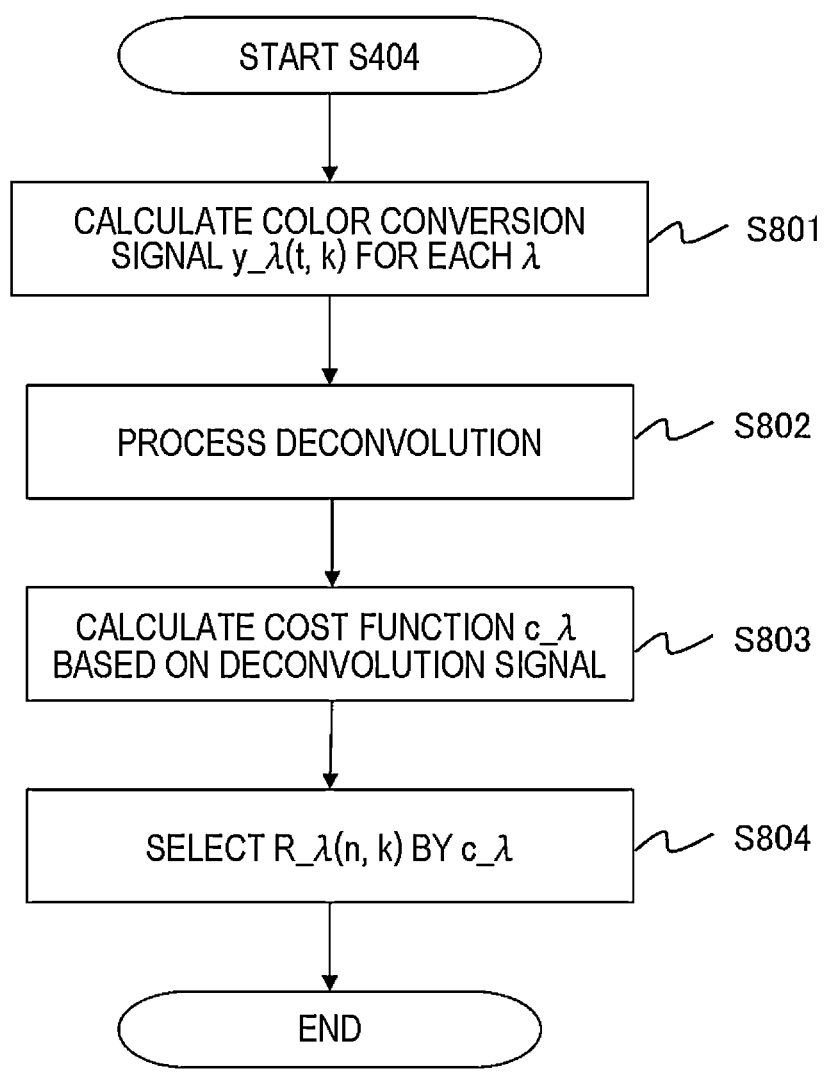
FIG. 8 is a diagram illustrating an example of a flow of candidate selection processing of a second embodiment.

The candidate selection process of this embodiment will be described with reference to FIG. 8. The process flow of FIG. 8 is executed in S403 of FIG. 4.

(S801)

Similar to S701, the selection unit 34 calculates the color conversion signal y_λ(t, k) for each parameter λ.

(S802)

The selection unit 34 performs deconvolution processing on the color conversion signal y_λ(t, k) calculated in S801. A known blind deconvolution processing or the like is used for the deconvolution processing. By the deconvolution processing, the deconvolution signal is calculated for each parameter λ.

(S803)

The selection unit 34 calculates the cost function c_λ based on the deconvolution signal calculated in S802.

(S804)

The selection unit 34 selects the color conversion matrix R_λ(n, k) from the candidates by the cost function c_λ calculated in S803.

According to the process flow described above, an appropriate color conversion matrix R_λ(n, k) can be obtained even when peaks appear simultaneously between the fluorescent dyes. Since the deconvolution signal has a higher degree of separation than the color conversion signal, the pull-down can be detected more easily.

Third Embodiment

In the first embodiment, it has been described that the color conversion matrix is selected by using the cost function based on the pull-down in the color conversion signal. In this embodiment, it will be described that a cost function based on a mobility correction processing signal obtained by subjecting the color conversion signal to the mobility correction processing is used. Since the overall configuration of this embodiment is the same as that of the first embodiment, the description thereof will be omitted.

Figure 9:
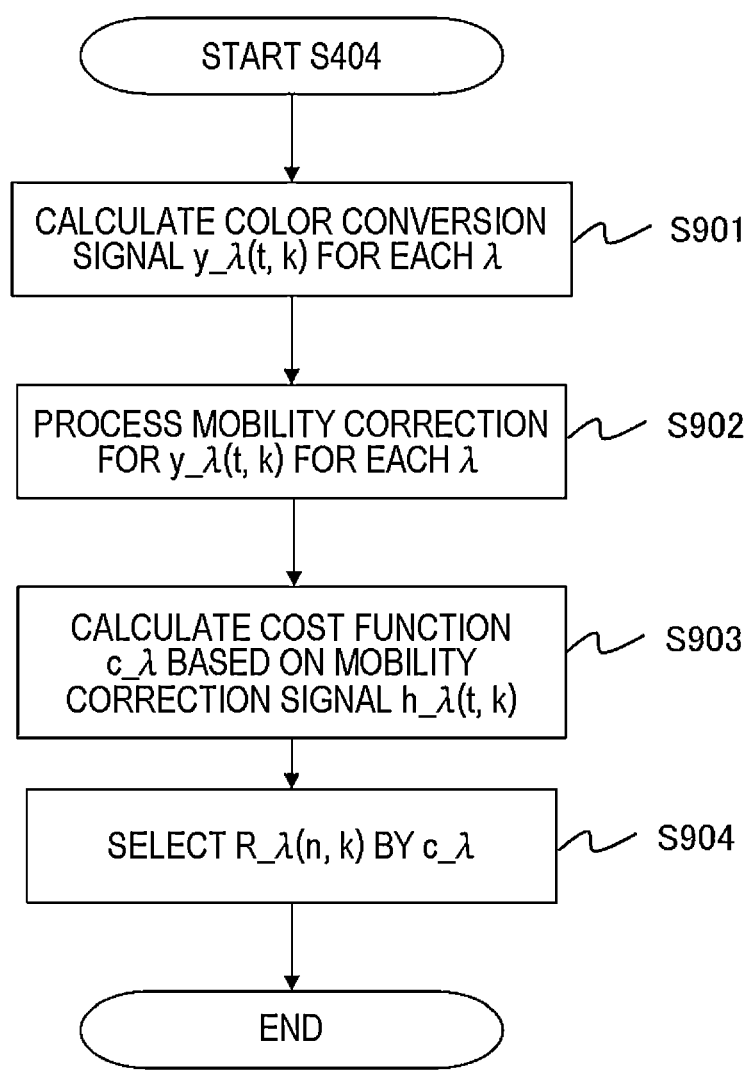
FIG. 9 is a diagram illustrating an example of a flow of candidate selection processing of a third embodiment.

The candidate selection process of this embodiment will be described with reference to FIG. 9. The process flow of FIG. 9 is executed in S403 of FIG. 4.

(S901)

Similar to S701, the selection unit 34 calculates the color conversion signal y_λ(t, k) for each parameter λ.

(S902)

Figure 10A:
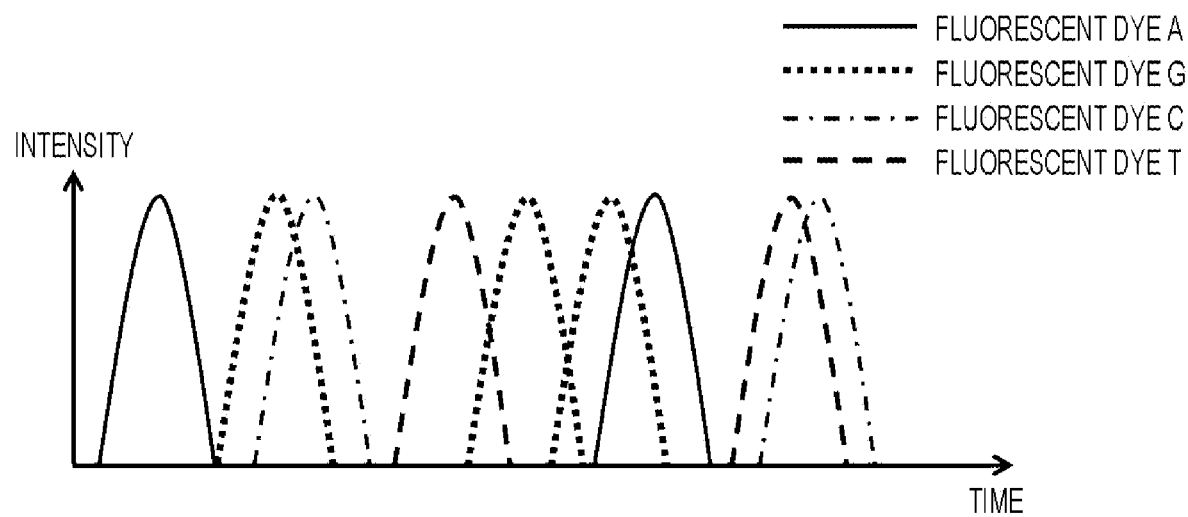
FIGS. 10A and 10B are diagrams for explaining mobility correction processing.
Figure 10B:
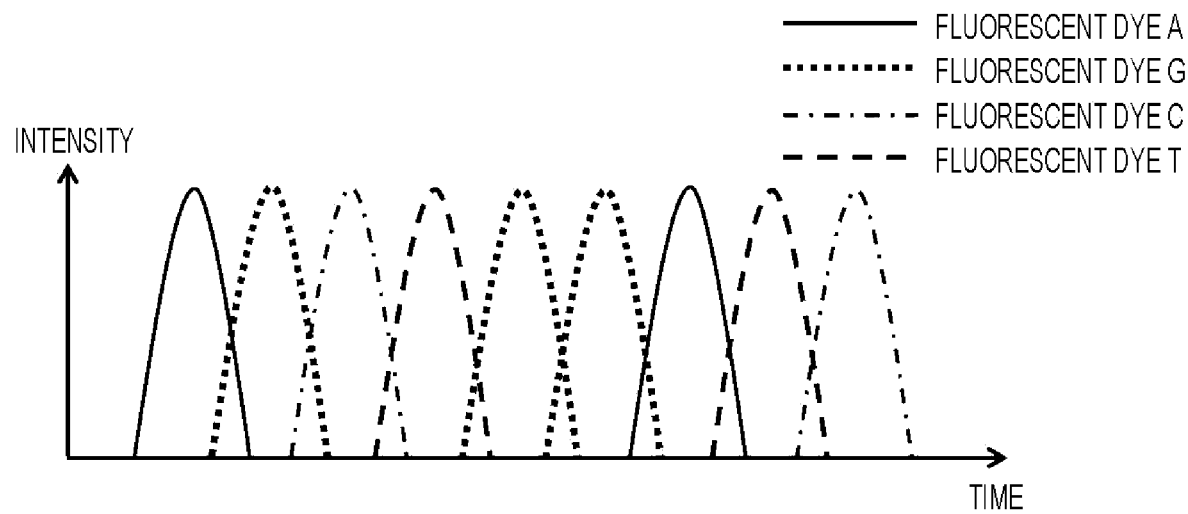

The selection unit 34 performs mobility correction processing on the color conversion signal y_λ(t, k) calculated in S901. The mobility correction processing is a process of moving the fluorescence spectrum of each fluorescent dye in the time direction so that the fluorescence peaks of the fluorescent dye are evenly spaced. FIG. 10 shows an example of the mobility correction processing for the fluorescence spectra of the four fluorescent dyes A, G, C, and T. FIG. 10A shows an example of the fluorescence spectrum before the mobility correction processing, in which the fluorescence peaks are unequally spaced. FIG. 10B is an example of the fluorescence spectrum after the mobility correction processing. The fluorescent dye A and the fluorescent dye C are moved in the positive direction of time, the fluorescent dye G is left as it is, and the fluorescent dye T is moved in the negative direction of time, so that the fluorescence peaks are evenly spaced.

Figure 11A:
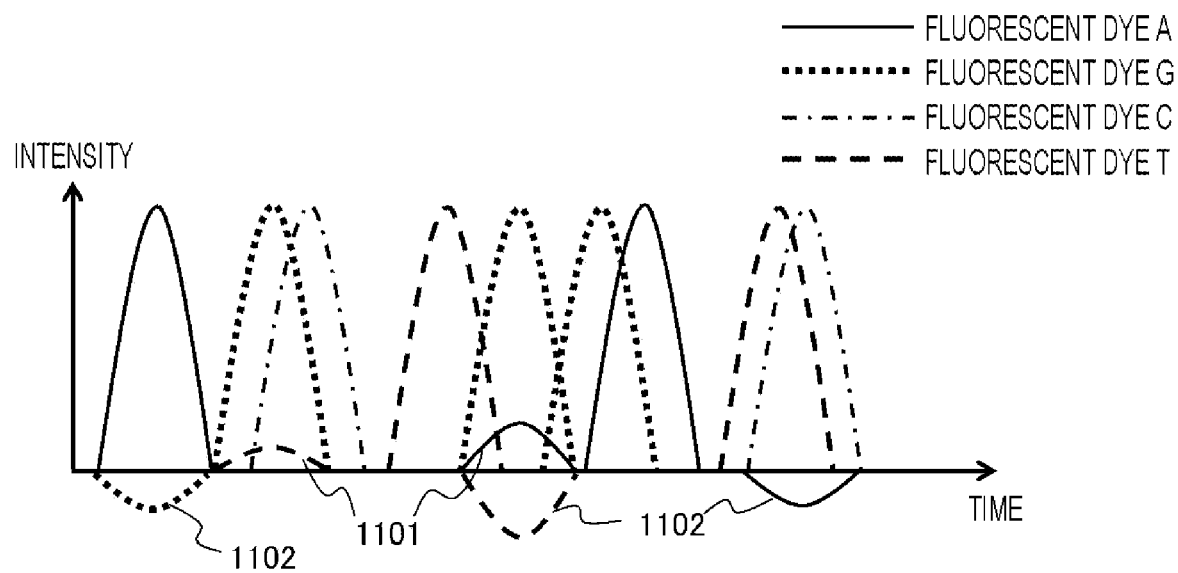
FIGS. 11A and 11B are diagrams for explaining an example when mobility correction processing is applied to a color conversion signal including pull-up and pull-down.
Figure 11B:
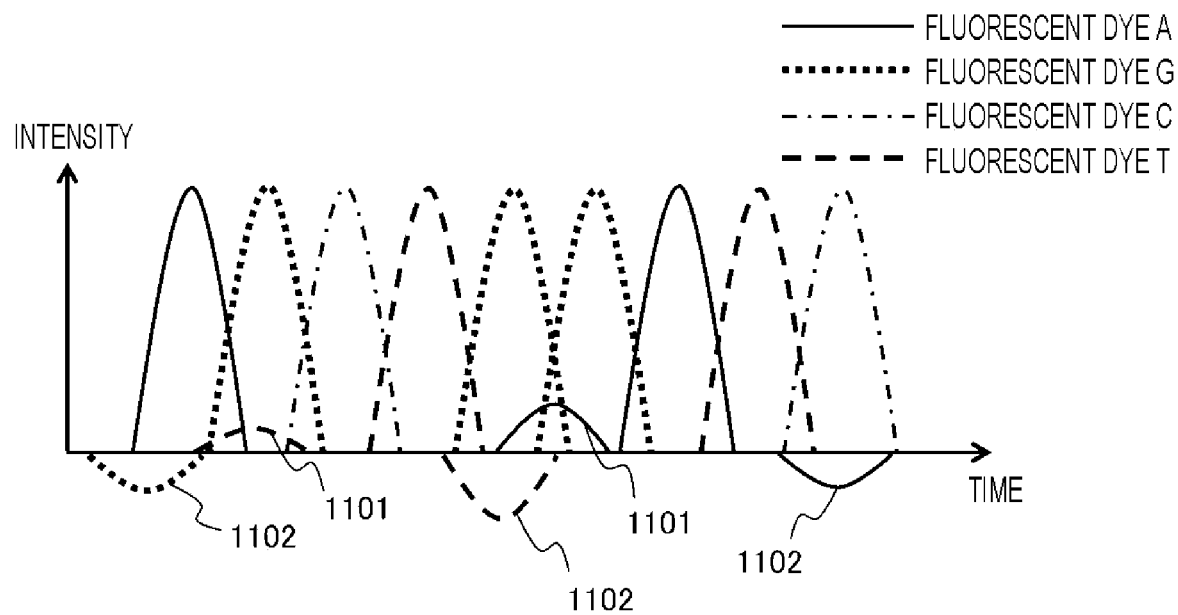

By the way, when the candidate R_λ(n, k) of the color conversion matrix contains an error, the color conversion signal y_λ(t, k) includes a pull-up 1101 and a pull-down 1102 as shown in FIG. 11A. When the mobility correction processing is applied to the color conversion signal y_λ(t, k) including the pull-up 1101 and the pull-down 1102, the peak interval is disturbed as shown in FIG. 11B. In this embodiment, the mobility correction processing is performed in this step in order to utilize the disturbance of the peak interval. A known method is used for the mobility correction processing, and a mobility correction signal h_λ(t, k) is calculated for each parameter λ from the mobility correction processing.

(S903)

The selection unit 34 calculates the cost function c_λ based on the mobility correction signal h_λ(t, k) calculated in S902. An example of the calculation procedure of the cost function c_λ will be described.

(1) The time series signal u_λ(t) is obtained by integrating h_λ(t, k) in the k direction. That is, the mobility correction signal h_λ(t, k) is treated without being distinguished by the fluorescent dye.

(2) Discrete Fourier transform is performed on u_λ(t) to obtain U_λ(ω). However, ω is a discretized frequency index.

(3) Calculate the power spectrum $V\_\lambda(\omega) = |U\_\lambda(\omega)|^2$.

(4) Find the maximum value W_λ of V_λ(ω) for ω in the specified range [$\omega_{begin}$, $\omega_{end}$]. W_λ represents the magnitude of the frequency component corresponding to the peak interval when there is no disturbance.

(5) In the specified range [$\omega_{begin}$, $\omega_{end}$], calculate the integrated value $E\_\lambda = \Sigma\ (V\_\lambda(\omega))$ of V_λ(ω) over the ω direction. E_λ is the power including all frequency components of the peak interval of the mobility correction signal h_λ(t, k), and increases as the peak interval is disturbed.

(6) Calculate c_λ = E_λ/W_λ as a cost function.

(S904)

The selection unit 34 selects the color conversion matrix R_λ(n, k) from the candidates by the cost function c_λ calculated in S903. The cost function c_λ of this embodiment is the magnitude of the frequency component corresponding to the peak interval when there is no disturbance, and is a value obtained by dividing the power including all the frequency components. Therefore, it becomes larger as the peak interval is disturbed. Therefore, the color conversion matrix R_λ(n, k) that minimizes the cost function c_λ is selected from the candidates.

According to the process flow described above, an appropriate color conversion matrix R_λ(n, k) can be obtained even when peaks appear simultaneously between the fluorescent dyes. Since the cost function c_λ of this embodiment does not require detection of pull-down or pull-up, an appropriate color conversion matrix R_λ(n, k) can be selected even when it is difficult to detect pull-down or pull-up due to a lot of noise.

The plurality of embodiments of the invention have been described above. The invention is not limited to these embodiments, but includes various modifications. For example, the above-described embodiments have been described in detail in a clearly understandable way of the invention, and are not limited to those having all the described configurations. In addition, some of the configurations of a certain embodiment can be replaced with the configuration of the other embodiment.

Further, it is possible to add the configuration of one embodiment to the configuration of another embodiment. It is possible to add, delete, and replace other configurations for a part of the configuration of each embodiment.

REFERENCE SIGNS LIST 1 spectral calibration apparatus
2 CPU
3 main memory
4 memory device
5 display memory
6 display device
7 controller
8 input device
10 network adapter
11 system bus
12 network
13 capillary electrophoresis type sequencer
14 spectral signal database
30 spectral signal
31 spectral signal acquisition unit
32 initial value calculation unit
33 candidate calculation unit
34 selection unit
35 color conversion matrix
1101 pull-up
1102 pull-down

The invention claimed is:

1. A spectral calibration apparatus for calculating a color conversion matrix used in color conversion processing, comprising:
    a spectral signal acquisition unit that acquires a spectral signal of fluorescence detected over time;
    an initial calculation unit the calculates initial values of a color conversion matrix and initial values of a temporal activation of fluorescence of the spectral signal by
        removing a spike signal from the spectral signal, to obtain a spike-less signal,
        removing a baseline from the spike-less signal, to obtain a modified signal,
        normalizing an intensity between wavelength channels based on the modified signal, to obtain a normalized signal,
        calculating the initial values of the color conversion matrix using the normalized signal, and
        calculating the initial values of the temporal activation of fluorescence using the initial values of the color conversion matrix;
    a candidate calculation unit that calculates a candidate of the color conversion matrix for each value of a parameter using the initial values of the color conversion matrix and the initial values of the temporal activation of fluorescence, which depends on a frequency at which fluorescence peaks of fluorescent dyes appear at the same time, based on the spectral signal; and
    a selection unit that selects a color conversion matrix based on an evaluation value calculated for each candidate.

2. The spectral calibration apparatus according to claim 1, wherein the selection unit extracts a pull-down from the color conversion signal calculated by using each candidate of the color conversion matrix calculated for each value of the parameter, and calculates the evaluation value using a cost function based on the pull-down.

3. The spectral calibration apparatus according to claim 1, wherein the selection unit executes deconvolution processing on the color conversion signal calculated using each candidate of the color conversion matrix calculated for each value of the parameter to acquire a deconvolution signal, and calculates the evaluation value using a cost function based on the deconvolution signal.

4. The spectral calibration apparatus according to claim 1, wherein the selection unit executes mobility correction processing on the color conversion signal calculated using each candidate of the color conversion matrix calculated for each value of the parameter to acquire a mobility correction signal, and calculates the evaluation value using a cost function based on the mobility correction signal.

5. A spectral calibration method for calculating a color conversion matrix used in color conversion processing, comprising:
    acquiring a spectral signal of fluorescence detected over time;
    removing a spike signal from the spectral signal, to obtain a spike-less signal;
    removing a baseline from the spike-less signal, to obtain a modified signal;
    normalizing an intensity between wavelength channels based on the modified signal, to obtain a normalized signal;
    calculating initial values of a color conversion matrix of the spectral signal using the normalized signal;
    calculating initial values of a temporal activation of fluorescence of the spectral signal using the initial values of the color conversion matrix;
    calculating a candidate of the color conversion matrix for each value of a parameter using the initial values of the color conversion matrix and the initial values of the temporal activation of fluorescence, which depends on a frequency at which a fluorescence peak of a fluorescent dye appears, based on the spectral signal; and
    selecting a color conversion matrix based on an evaluation value which is calculated for each candidate.

6. The spectral calibration method according to claim 5, wherein, in the selecting, a pull-down is extracted from the color conversion signal calculated by using each candidate of the color conversion matrix calculated for each value of the parameter, and the evaluation value is calculated using a cost function based on the pull-down.

7. The spectral calibration method according to claim 5, wherein, in the selecting, deconvolution processing is executed on the color conversion signal calculated using each candidate of the color conversion matrix calculated for each value of the parameter to acquire a deconvolution signal, and the evaluation value is calculated using a cost function based on the deconvolution signal.

8. The spectral calibration method according to claim 5, wherein, in the selecting, mobility correction processing is executed on the color conversion signal calculated using each candidate of the color conversion matrix calculated for each value of the parameter to acquire a mobility correction signal, and the evaluation value is calculated using a cost function based on the mobility correction signal.

* * * * *